Nov. 14, 1944.    A. J. HUCK    2,362,752
TIMER FOR TOASTERS AND THE LIKE
Filed Nov. 12, 1942    2 Sheets-Sheet 1
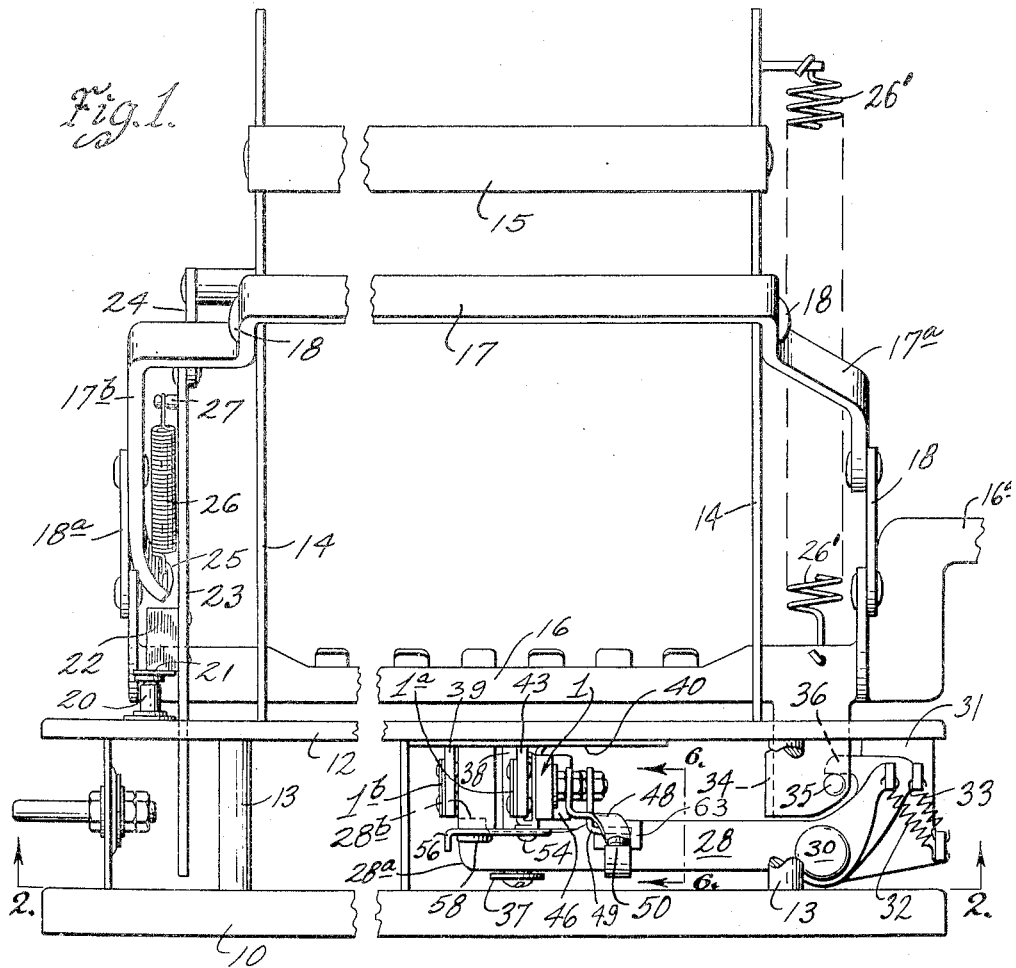
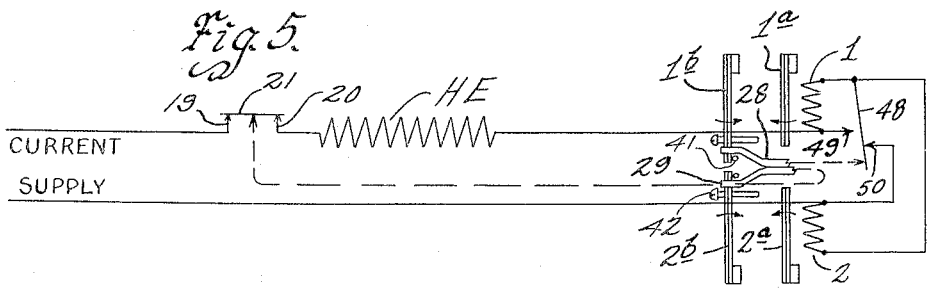
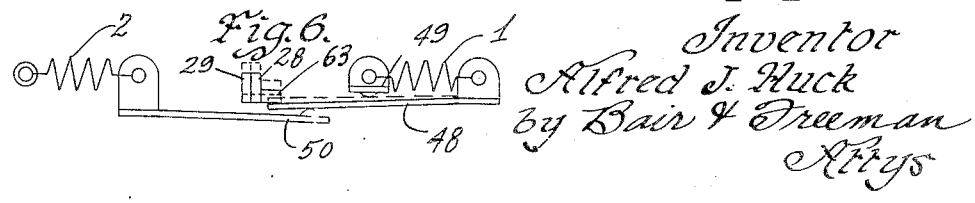
Inventor
Alfred J. Huck
by Bair & Freeman
Attys Nov. 14, 1944.  A. J. HUCK  2,362,752
TIMER FOR TOASTERS AND THE LIKE
Filed Nov. 12, 1942    2 Sheets-Sheet 2
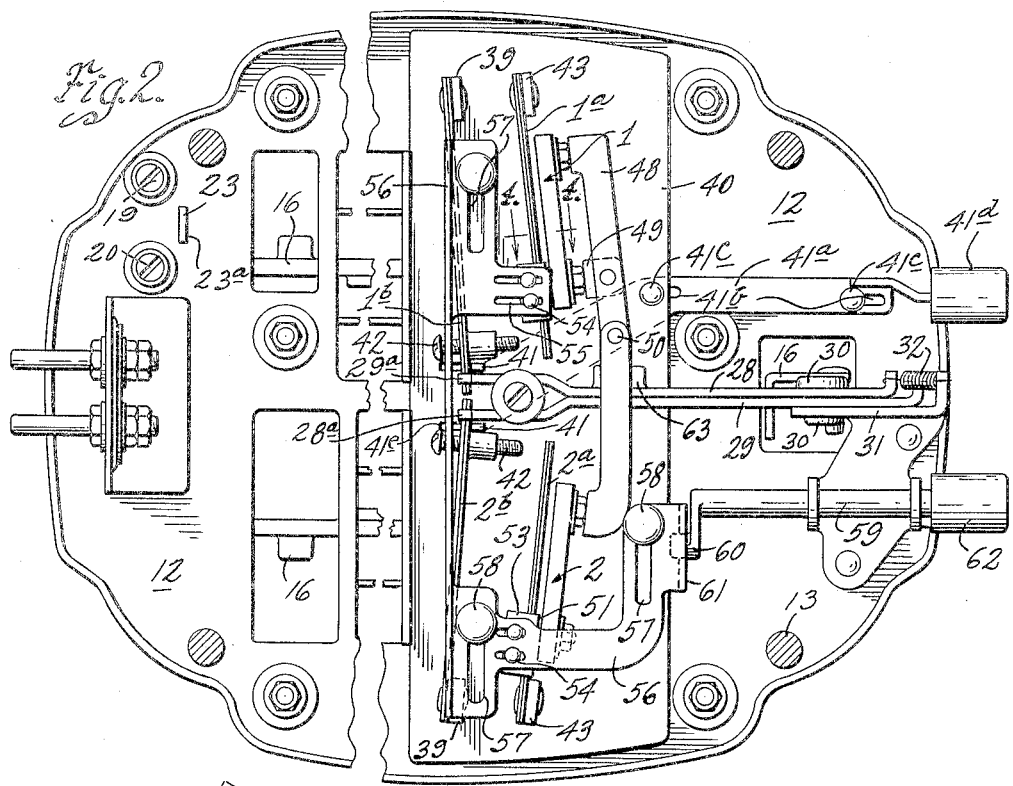
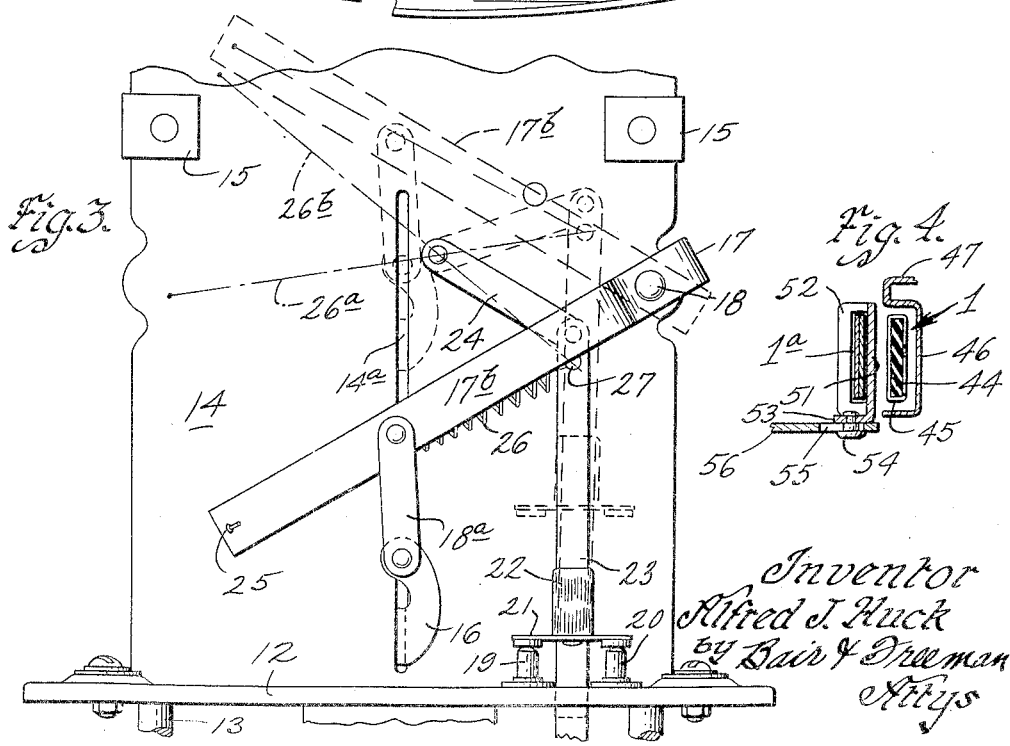
Inventor
Alfred J. Huck
by Bair & Freeman
Attys Patented Nov. 14, 1944

2,362,752

UNITED STATES PATENT OFFICE 2,362,752

TIMER FOR TOASTERS AND THE LIKE

Alfred J. Huck, St. Louis, Mo., assignor to Knapp-Monarch Company, St. Louis, Mo., a corporation of Missouri Application November 12, 1942, Serial No. 465,361

14 Claims. (Cl. 161—1)

My present invention relates to a timer for toasters and the like, the timer being thermally operated and adapted to deenergize the heating element of the toaster at the end of a toasting period, with the timing cycles being varied to secure substantially even color of toast, regardless of how long the toaster has been in operation.

One object of the invention is to provide a thermal timer for toasters, with means to secure more even toasting of successive slices of bread by a reverse acting compensating means to correct an inherent overcompensating characteristic of the thermal timing means.

Another object is to provide such reverse acting compensating means in the form of bimetal elements or the like, bearing, with variable pressure, against stop elements therefor, depending upon the degree of ambient temperature, the reverse acting compensating elements being engaged by the timer elements after they have moved part of their distance, and opposing further movement in proportion to the undesirable overcompensation characteristic thereof.

Still another object is to provide a color control means for the toast, where the toast is provided with thermal timing means including electrical heaters, the color control means being in the form of heat baffles interposed between the heaters and the thermally responsive members of the timers, whereby the heating effect can be varied to accomplish variation in the timing periods.

Still another object is to provide a toaster having a main switch which is snap-actuated to closed and open positions by a toggle spring connected with a bread carrier, the arrangement being such as to cause the toggle spring to provide a momentary retarding action to prevent the toast from being ejected too vigorously, and thereby serving as a low-cost substitute for a dash-pot.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation of a toaster frame with the casing, the heating elements and a few of the operating parts omitted, in order to show the essential parts of my timer mechanism, the bread carrier being shown in depressed position;

Figure 2 is a bottom view, as taken on the section line 2—2 of Figure 1;

Figure 3 is an end elevation looking at the left end of Figure 1 to show the action of the main switch with relation to the bread carrier;

Figure 4 is an enlarged sectional view on the line 4—4 of Figure 2, showing a heat baffle between a timer element and its heating element;

Figure 5 is an electro-diagrammatic view of the timing mechanism in relation to the heating element of the toaster; and Figure 6 is a diagrammatic view as taken along the line 6—6 of Figure 1, showing only the switching mechanism for the timer heaters and the timer heaters themselves.

On the accompanying drawings I have used the reference numeral 10 to indicate a base, and 12 a sub-base. The sub-base 12 is mounted on the base 10 by means of posts 13. Extending upwardly from the sub-base 12 are end plates 14 between which the heating elements (not shown in Figure 1) are mounted. A heating element is shown diagrammatically at HE in Figure 5, and of course there may be one, or any number of heating elements, the present toaster being illustrated as an "oven" type provided with three spaced heating elements, leaving two spaces betaween them for two slices of bread. The slices of bread are supported on a bread carrier 16, having a bread supporting bar in each of the two spaces.

The end plates 14 are connected together by bars 15, and the bread carriers 16 are supported with relation to the end plates by a U-shaped bar 17. This bar is pivoted at 18 to the end plates, and acts as a rock shaft, having arms 17ª and 17ᵇ. The arm 17ª is connected by a link 18 to the front end of the bread carrier, where it has an extension 16ª to an operating handle (not shown). Likewise, the arm 17ᵇ is connected by a link 18ª to the rear end of the bread carriers 16, the construction of these parts being more fully shown in my copending application, Serial No. 418,455, filed November 10, 1941.

A main switch is provided in the form of a pair of contacts 19 and 20, and a bridging contact 21. The bridging contact 21 is carried by a block of insulation 22 which, in turn, is carried by a vertically slidable bar 23. This bar slides through a perforation 23ª in the sub-base 12, and at its upper end is pivoted to one end of a link 24. The other end of the link is pivoted to a stationary point, such as one of the end plates 14.

The arm 17ᵇ of the U-shaped bar 17 has a perforation 25 at its end, and one end of a toggle spring 26 is hooked into this perforation, the other end thereof being connected with a stud 27 on the bar 23. Accordingly, as the arm 17b swings downwardly from the upper limit of movement shown by dash lines in Figure 3, it assumes a position about half way of its stroke, where the toggle spring is on dead center, as indicated at 26a. Further downward movement of the arm 17b, as the bread carrier is depressed, causes the toggle spring to pass center, and the bridging contact 21 to be thrown down against the contacts 19 and 20, with snap action, thereby insuring a quick and positive make, suitable for either D. C. or A. C. operation.

The bread carrier is adapted to be latched in a lowered position, and to be raised by a spring 26'. The latch will hereinafter be described. When the latch is released, however, the spring will raise the bread carrier, and will swing the toggle spring 26' to a position indicated at 26b, where it is again on dead center. The remaining slight movement of the arm 17b upwardly to its original dash-line position in Figure 3, will snap the main switch open, thereby providing a clean break of the circuit. This is particularly necessary when the toaster is operated on direct current.

It will also be noted that the line 26b, where the toggle spring 26' is on dead center during the upward movement of the bread carrier, is adjacent the end of the stroke. The toggle spring 26', therefore, during the major portion of the stroke, has a retarding effect on the upward movement of the bread carrier, thus acting, in addition to its capacity as a toggle spring for snap action of the main switch, as a low-cost substitute for a dash-pot. Its retarding action prevents the toast from being ejected too vigorously at the end of the toasting cycle.

My timing mechanism includes a first heater 1 and a second heater 2, which act upon timing bimetals 1a and 2a, respectively. The timing bimetals are adapted to release a pair of bars 28 and 29 by mechanism which will hereinafter be described. These bars are pivoted on a rivet 30, which is carried by a bracket 31 extending downwardly from the sub-base 12. Springs 32 and 33 tend to rotate the bars 28 and 29 clockwise in Figure 1. The bars are rotated counterclockwise by the bread carrier 16 when it is depressed, the bread carrier having a flange 34 to accomplish this purpose. After the bars are depressed to the position shown in Figure 1 (their normal position being raised at the left end) the bread carrier 16 is released and will move up slightly until a pin 35, carried thereby, is hooked under a latch lug 36 of the bar 29. The bars 28 and 29 are limited in their downward movement by a washer 37 supported on a post 38 extending downwardly from a mounting plate 40.

A pair of leaf spring latches are provided for the left ends of the bars 28 and 29, and these, preferably, take the form of bimetal elements 1b and 2b. They are supported by lugs 39 extending downwardly from the mounting plate 40. The bimetal elements 1b and 2b, which I shall call reverse acting compensating elements, for reasons which will hereinafter appear, normally assume positions lightly engaging stops 41, due to their inherent resiliency when cold. They are further provided with adjusting screws 42 which constitute a factory adjustment for timing periods. These timing periods are for the bimetal elements 1a and 2a.

The stops 41 are carried by a slide plate 41a having an operating knob 41d. The plate 41a is slidably mounted by means of a slot and rivet mountings 41b—41c, and the stops 41 extend through slots 41e in the mounting plate 40. The bimetal elements 1a and 2a are secured to lugs 43 extending downwardly from the mounting plate 40.

The heaters 1 and 2 will be referred to as first and second heaters, as they are operated in this sequence during a timing cycle. Each heater may include a core of mica or insulating material 44 (see Figure 4) with a resistance element 45 wound around it, and the heater partially enclosed in a casing 46. The casing 46 may be of sheet metal, and provided with a foot 47 for mounting it on the mounting plate 40. The casing 46 serves to direct the majority of the heat generated by each heater toward its respective timing bimetal.

The heaters 1 and 2 are controlled as to energization by a switch blade 48 and a pair of contacts 49 and 50, with which the switch blade selectively coacts. In Figure 6 coaction is shown between the switch blade 48 and the contact 50, whereas the normal position of the switch blade, due to its inherent resiliency, is against the contact 49, as shown by dotted lines.

It is desirable to control the color of toast toasted in the successive cycles so as to secure light, medium or dark toast, as desired. I have found a very satisfactory way of controlling the color by means of adjustable heat baffles, which will now be described. For each timing bimetal 1a and 2a a heat baffle is provided in the form of a metal plate 51 having a pair of flanges 52 which are perforated so that the timing bimetal extends loosely through them. This plate has a third flange 53 along its lower edge, which carries a pair of rivets 54 which loosely slide in slots 55 of an adjusting plate 56. The adjusting plate 56 has three slots 57, coacting with headed posts 58 extending downwardly from the mounting plate 40, whereby the plate may be slid to one extreme position, shown in Figure 2, or to an opposite extreme position (upward in this figure). For thus sliding the plate an adjusting shaft 59 is provided, having a crank pin 60 coacting with a slotted flange 61 of the plate 56, whereby rotation of the shaft 59 causes the desired movement of the plate 56. The slot in the flange 61 extends vertically, so that there is no lateral lost play between the crank pin and the slot, but rotation of the crank is permitted. A knob 62 is provided on the shaft 59 for convenience in rotating the crank.

*Practical operation*

In the operation of my toaster, slices of bread may be placed on the bread carrier bars 16, and the extension 16a may be moved from a normally raised position, shown by dash lines in Figure 3, to the lowered position, shown by solid lines in Figures 1, 2 and 3. Lowering of the bread carrier closes the main switch 19—20—21, as already described, and swings the bars 28 and 29 from normally raised position to the lowered position of Figures 1 and 2. The left ends of the bars 28 and 29 are slightly inclined or rounded, as shown at 28a in Figure 1, so that they push the reverse acting compensating elements 1b and 2b away from their stops 41 until the upper edges, indicated at 28b, of the bars 28 and 29, are below the lower edges of the elements 1b and 2b, whereupon these elements swing in above the ends 28b, and engage the stops 41, as in Figure 2. The bars 28 and 29 are thus latched against return movement upwardly under the constraint of the springs 32 and 33, and the extension 36 of the bar 29 is holding the pin 35 so that the spring 26 cannot raise the bread carrier bars 16.

The bar 28 carries an insulating extension 63 which engages the switch blade 48 and moves it from the dotted position of Figure 6 to the full-line position. The parts are now in the position shown in Figure 5, so that current can be traced from the upper current supply wire through the main switch 19—20—21, through the heating element HE, and through the heater 1, back to the lower current supply wire. Heater 1 accordingly generates heat, which is radiated to the timing bimetal 1$^a$, causing it to warp in the direction of the small arrow which crosses it, so that it eventually strikes the adjusting screw 42 of the latch 1$^b$, and after a further period stores up enough energy to move the latch and disengage it from its respective bar 28. The spring 32 thereupon swings the bar clockwise in Figure 1, or upward to the dotted position of Figure 6, permitting the switch blade 48 to close with the contact 49 and disengage the contact 50. The current from the heating element HE is now traced from the heating element HE, through 49 and 48, and then through the second heater 2, before returning to the lower current supply wire. The heater 2 now heats for a second part of the over-all timing period, and, likewise, warps its respective bimetal timer element 2$^a$ in the direction of the arrow which crosses it, until it engages the screw 42 of the element 2$^b$ and moves this element to unlatching position with respect to the bar 29. The bar 29 is then free to move under the bias of the spring 33 for unhooking the latch lug 36 from the pin 35, thereby permitting the spring 28 to move the bread carrier bar 16 upwardly, and the arm 17$^b$ of the U-shaped bar 17 to actuate the main switch 19—20—21 to its open position as hereinbefore described. Thus the timing heater 1 is heated during a first part of a single timing cycle, and at the end of its particular part of the cycle effects a release of the bar 28 to change the switch blade 48 for deenergizing the heater 1. The heater 2 then continues the timing cycle, and at the end thereof releases the bread carrier so that it is raised to indicate the completion of the toasting cycle and the current to the heating element HE, and, likewise, the heater 2, is automatically turned off at the main switch. The switch blade 48 is then in the dotted position of Figure 6, which may be termed the normal position and ready to be reset again by the manual depression of the bread carrier.

Since the timer elements 1$^a$ and 2$^a$ are thermally responsive, they are self-compensating for ambient temperature rise, i. e., they also respond to ambient temperature and thereby assume greater warp when the toaster is heated than when it is cold. When they are warped to a greater degree they are closer to the adjusting screws 42 at the end of their individual parts of the timing cycle, and therefore trip the latches 1$^b$ and 2$^b$ more quickly as the toast temperature rises. They thus compensate for temperature rise, but I have found that their degree of compensation is too much; in other words, they overcompensate for ambient temperature rise. It is therefore desirable to cut down their function by making the latches 1$^b$ and 2$^b$ for the bars 28 and 29 of bimetal material, which warp in opposite directions, as indicated by the small arrows which cross them in Figure 5, upon ambient temperature rise. Accordingly, these reverse acting compensators 1$^b$ and 2$^b$ change in the degree of pressure engagement against the stops 41. As ambient temperature rises, this pressure increases without, however, changing the positions of the elements 1$^b$ and 2$^b$ as they are limited by the stops. A greater pressure of the elements 1$^b$ and 2$^b$ against the stops, however, causes them to require greater pressure to move them to a position for releasing the bars 28 and 29. Therefore, the timing period is lengthened to compensate for the period which has been shortened too much, due to the overcompensating characteristics of the timers 1$^a$ and 2$^a$. These timer elements, when the ambient temperature is high, must store greater energy during warping toward releasing position before they can overcome the opposing forces of the elements 1$^b$ and 2$^b$ sufficiently to permit these elements to be swung away from the stops 41. Thus the inherent overcompensation characteristic of the timer elements 1$^a$ and 2$^b$ are taken care of so as to secure substantially the same color of toast, regardless of whether the toast is cold, or whether it is partially or completely heated up.

As to the adjustment of the heat baffles 51 for color control of the toast, I have found that a maximum amount of heat from the heaters 1 and 2 strikes the timer bimetals 1$^a$ and 2$^a$ when the heat baffles are adjacent the ends of the heaters, as shown in Figure 2, thus causing the timers to move more rapidly, and resulting in light toast. When the heat baffles are moved to a position adjacent the centers of the heaters, then a minimum amount of heat is radiated to the bimetal timers and results in long timing and dark toast. Various intermediate positions of the heat baffles then produce various grades of intermediate color in the toast. Thus a simple mechanical arrangement effects a change in the timing period under control of the user to suit individual demands. The loose sliding fit of the rivets 54 in the slots 55 permits free movement of the heat baffle with the timer elements as they warp under the influence of heat from the heaters, and thus does not interfere with the timing action.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a timer for electric appliances and the like, a first timer adapted to be energized upon energization of the appliance, a switch controlled thereby, a second timer adapted to be energized upon movement of said switch from one position to another position at the end of a first part of the timing cycle, said switch, in said another position, deenergizing said first timer, means operable by said second timer after a second part of the timing cycle to deenergize the appliance, said timers inherently overcompensating for rise in ambient temperature, reverse acting compensating means cooperating with said timers to prevent such overcompensation comprising temperature responsive elements tending to move upon rise of ambient temperature in a direction to oppose movement of said timers, stops to limit the movement of said temperature responsive elements in such direction whereby their tendency to move effects increase in pressure thereof against said stops and thereby an increase in their power of opposition relative to said timers.

2. In a timer for installation in a circuit to be controlled, a main switch, first and second timers, an auxiliary switch therefor, said auxiliary switch being settable to one position permitting only one of said timers to become energized in the circuit, said one of said timers at the end of a timing period effecting a shift of said auxiliary switch to a position transferring electrical energization from said one of said timers to the other one, said other timer, after a further timing period, effecting opening of said main switch, said timers being self-overcompensating for ambient temperature rise, and means to reduce such overcompensation to a desirable degree comprising thermally responsive elements tending to move in opposite directions to the direction of movement of said timers when said thermally responsive elements respond to ambient temperature changes, stops for said thermally responsive elements, their movement, due to ambient temperature rise, tending to effect a variation in pressure of said thermally responsive elements against said stops depending on the degree of ambient temperature, said timers, after partial movement through their timing distances, engaging said thermally responsive elements to be opposed thereby during the remainder of their timing distances.

3. In a timer for installation in a circuit to be controlled, a main switch, first and second timers, an auxiliary switch therefor, said auxiliary switch being settable to one position premitting only one of said timers to become energized in the circuit, said one of said timers at the end of a timing period effecting a shift of said auxiliary switch to a position transferring electrical energization from said one of said timers to the other one, said other timer, after a further timing period, effecting opening of said main switch, said timers being self-overcompensating for ambient temperature rise, and means to reduce such overcompensation to a desirable degree comprising thermally responsive elements tending to move in opposite directions to the direction of movement of said timers when said thermally responsive elements respond to ambient temperature changes, stops for said thermally responsive elements, their movement, due to ambient temperature rise, tending to effect a variation in pressure of said thermally responsive elements against said stops depending on the degree of ambient temperature, said timers, after partial movement through their timing distance, engaging said thermally responsive elements to be opposed thereby during their further movement, said thermally responsive elements constituting latches for said auxiliary and main switches.

4. In a timer for installation in a circuit to be controlled, a main switch, first and second timers, an auxiliary switch therefor, said auxiliary switch being settable to one position permitting only one of said timers to become energized in the circuit, said one of said timers at the end of a timing period effecting a shift of said auxiliary switch to a position transferring electrical energization from said one of said timers to the other one, said other timer, after a further timing period, effecting opening of said main switch, said timers being self-overcompensating for ambient temperature rise, and means to reduce such overcompensation to a desirable degree comprising thermally responsive elements tending to move in opposite directions to the direction of movement of said timers when said thermally responsive elements respond to ambient temperature changes, stops for said thermally responsive elements, their movement, due to ambient temperature rise, tending to effect a variation in pressure of said thermally responsive elements against said stops depending on the degree of ambient temperature, said timers, after partial movement through their timing distance, engaging said thermally responsive elements to be opposed thereby during their further movement, said thermally responsive elements constituting latches for said auxiliary and main switches, and said stops being manually movable to thereby unlatch said thermally responsive elements relative to said switches.

5. In a timer for electrical appliances, a first timer adapted to be energized upon energization of the appliance, a switch controlled thereby, a second timer adapted to be energized by said switch upon movement thereof from one position to another position during the first part of the timing cycle, said switch in said another position deenergizing said first timer, means operable by said second timer after completion of the timing cycle to deenergize the appliance and the second heater, said timers being inherently self-overcompensating for ambient temperature rise, and means to reduce such overcompensation to a desirable degree comprising a thermally responsive element for each timer tending to move in an opposite direction to the direction of movement of the timer when the timer and the thermally responsive element respond to ambient temperature changes, a stop for each of said thermally responsive elements, their movement effecting a variation in the pressure of the thermally responsive elements against their stops, said timers, after partial movement, engaging said thermally responsive elements to be opposed thereby during further movement.

6. In a timer for electrical appliances, a first timer adapted to be energized upon energization of the appliance, a switch controlled thereby, a second timer adapted to be energized upon movement of said switch from one position to another position during the first part of the timing cycle, said switch in said another position deenergizing said first timer, a main switch operable by said second timer after completion of the total timing cycle to deenergize the appliance and the second heater, said timers being inherently self-overcompensating for ambient temperature rise, and means to reduce such overcompensation to a desirable degree comprising a thermally responsive element for each timer tending to move in an opposite direction to the direction of movement of the timer upon ambient temperature rise, a stop for each of said thermally responsive elements, said thermally responsive elements constituting release means for said switches, said timers, after partial movement, engaging said thermally responsive elements to be opposed thereby during further timer movement.

7. A thermally responsive electric timer including first and second thermally responsive members provided with individual electric heaters, means for supplying current to said electric heaters, automatic current controlling means actuated by said first thermally responsive member when the latter has been heated to a predetermined extent to switch the current from the electric heater of said first member to the electric heater of said second member, automatic means operative to cut off the supply of current to the electric heater of said second member when said second member has been heated to a predetermined extent, said members being also heated by ambient temperature and thereby inherently overcompensating for rise in ambient temperature, means for preventing excessive compensation comprising reverse acting thermally responsive elements, stops therefor in positions normally spaced from said first and second thermally responsive members, said reverse acting thermally responsive elements increasing in pressure against said stops as ambient temperature rises, and being engageable by said first and second thermally responsive members after they have moved part way through their timing distances.

8. A thermally responsive electric timer including first and second thermally responsive members provided with individual electric heaters, means for supplying current to said electric heaters, automatic current controlling means actuated by said first thermally responsive member when the latter has been heated to a predetermined extent to switch the current from the electric heater of said first member to the electric heater of said second member, automatic means operative to cut off the supply of current to the electric heater of said second member when said second member has been heated to a predetermined extent, said members being also heated by ambient temperature and thereby inherently overcompensating for rise in ambient temperature, means for reducing such overcompensation comprising reverse acting thermally responsive elements, stops therefor in positions normally spaced from said members, said thermally responsive elements constituting release means for said automatic means and for the main circuit being timed by said timer.

9. In a timer apparatus for electrical appliances, a first timer adapted to be energized upon energization of the appliance, a switch controlled thereby, a second timer adapted to be energized upon movement of said switch from one position to another position during the first part of the timing cycle, said switch in said another position deenergizing said first timer, means operable by said second timer after a second part of the timing cycle to deenergize the electrical appliance, said first and second timers being additionally responsive to ambient temperature and thereby inherently overcompensatory in action, and means to reduce the overcompensation thereof comprising reverse acting compensating means responsive to ambient temperature, stops for said reverse acting compensating means whereby an increase in ambient temperature increases the pressure thereof against said stops, said first and second timers being engageable with said reverse acting compensating elements to move them away from their stops after part of the movement of each timer has been completed.

10. In a timer apparatus for electrical appliances, a timer including a heater to which the timer is responsive, said timer being additionally responsive to ambient temperature and thereby inherently overcompensatory in action, and means to reduce the overcompensation thereof comprising a reverse acting compensating means responsive to ambient temperature, a stop for said reverse acting compensating means whereby an increase in ambient temperature increases the pressure thereof against said stop, said timer being engageable with said reverse acting compensating element to move it away from its stop after part of the movement of the timer cycle has been completed.

11. In a timer installation in a circuit to be controlled, a main switch, first and second timers, an auxiliary switch therefor, said auxiliary switch being settable to one position permitting only one of said timers to become energized in the circuit, said one of said timers at the end of the timing period effecting a shift of said auxiliary switch to a position transferring electrical energization therefrom to the other one, said other timer, after a further timer period, effecting opening of said main switch, said timers including heaters, and means to vary the timing period of said timers comprising baffle members interposed between said heaters and said timers and variable in position relative thereto.

12. In a timer apparatus for electrical appliances, a first timer adapted to be energized upon energization of the appliance, a switch controlled thereby, a second timer adapted to be energized upon movement of said switch from one position to another position at the end of a first part of the timing cycle, said switch, in said another position, deenergizing said first timer, means operable by said second timer after a second part of the timing cycle to deenergize the appliance, said timers each including a thermally responsive member and a heater therefor, and means for changing the timing period of each of said thermally responsive members comprising a heat baffle between said heater and said thermally responsive member, said heat baffle being variable in position to change the effect of said heater on said member.

13. In a timer apparatus for electrical appliances, a first timer including a heater adapted to be energized upon energization of the electrical appliance, a switch controlled by said first timer, a second timer adapted to be energized upon movement of said switch from one position to another position at the end of a first part of the timing cycle, said switch in said another position deenergizing the heater of said first timer, means operable by said second timer after a second part of the timing cycle to deenergize said electrical appliance, and means for changing the timing period comprising heat baffles between said heaters and said timers, said heat baffles being variable in position along said timers to change the effect of said heaters thereon.

14. In a timer installation in a circuit to be controlled, a main switch, first and second timers, an auxiliary switch therefor, said auxiliary switch being settable to one position permitting only one of said timers to become energized in the circuit, said one of said timers at the end of a timing period effecting a shift of said auxiliary switch to a position transferring electrical energization from said one of said timers to the other one, said other timer, after a further timing period, effecting opening of said main switch, each of said timers including a heater, and means to vary the timing period of each of said timers comprising a baffle member interposed between each heater and its respective timer and simultaneously variable in position relative thereto.

ALFRED J. HUCK.